Nov. 11, 1930.  L. C. BONNOT  1,781,097
DISK FEEDER AND MIXER
Filed July 22, 1929    2 Sheets-Sheet 1

Inventor
Louis C. Bonnot
By Harry Frease
Attorney

Nov. 11, 1930.  L. C. BONNOT  1,781,097
DISK FEEDER AND MIXER
Filed July 22, 1929   2 Sheets-Sheet 2

Inventor
Louis C. Bonnot
By Harry Frease Attorney

Patented Nov. 11, 1930

1,781,097

UNITED STATES PATENT OFFICE

LOUIS C. BONNOT, OF LOUISVILLE, OHIO, ASSIGNOR TO THE BONNOT COMPANY, OF CANTON, OHIO, A CORPORATION OF OHIO

DISK FEEDER AND MIXER

Application filed July 22, 1929. Serial No. 379,963.

My invention relates to improvements in disk feeders of the type set forth in my prior Patent No. 1,679,398, and which include a bin or hopper having a valve spout discharging upon a rotary feeding disk, and a scraper blade extending across the disk from one side of the spout.

In the apparatus of my prior patent, a single hopper only is employed, and there is no provision for blending and feeding different materials.

The objects of the present invention include the provision of an apparatus operating according to the general principle of operation of the apparatus of my prior patent, and adapted for blending and feeding a plurality of different materials.

Further objects of the improvements include the provision of means permitting the blending of the different materials in any desired ratios.

These and other objects are attained by the present invention, which may be stated in general terms as including a plurality of bins, hoppers, or the like each having a spout discharging upon a rotary preferably horizontal feeding disk, and valve means for each spout controlling the rate of flow of material therethrough, another rotary feeding and blending disk below the first disk and preferably integrally connected therewith, and means associated with each spout, for combined action with the first rotary disk for scraping the material discharged from the spout from the first disk to the blending disk, and a scraper for combined action with the blending disk for scraping the blended material therefrom in a continuous stream to a conveyor, chute, or receptacle.

The foregoing and other combinations comprising the invention, are set forth in greater detail hereafter, and claimed.

Figures 1, 3:
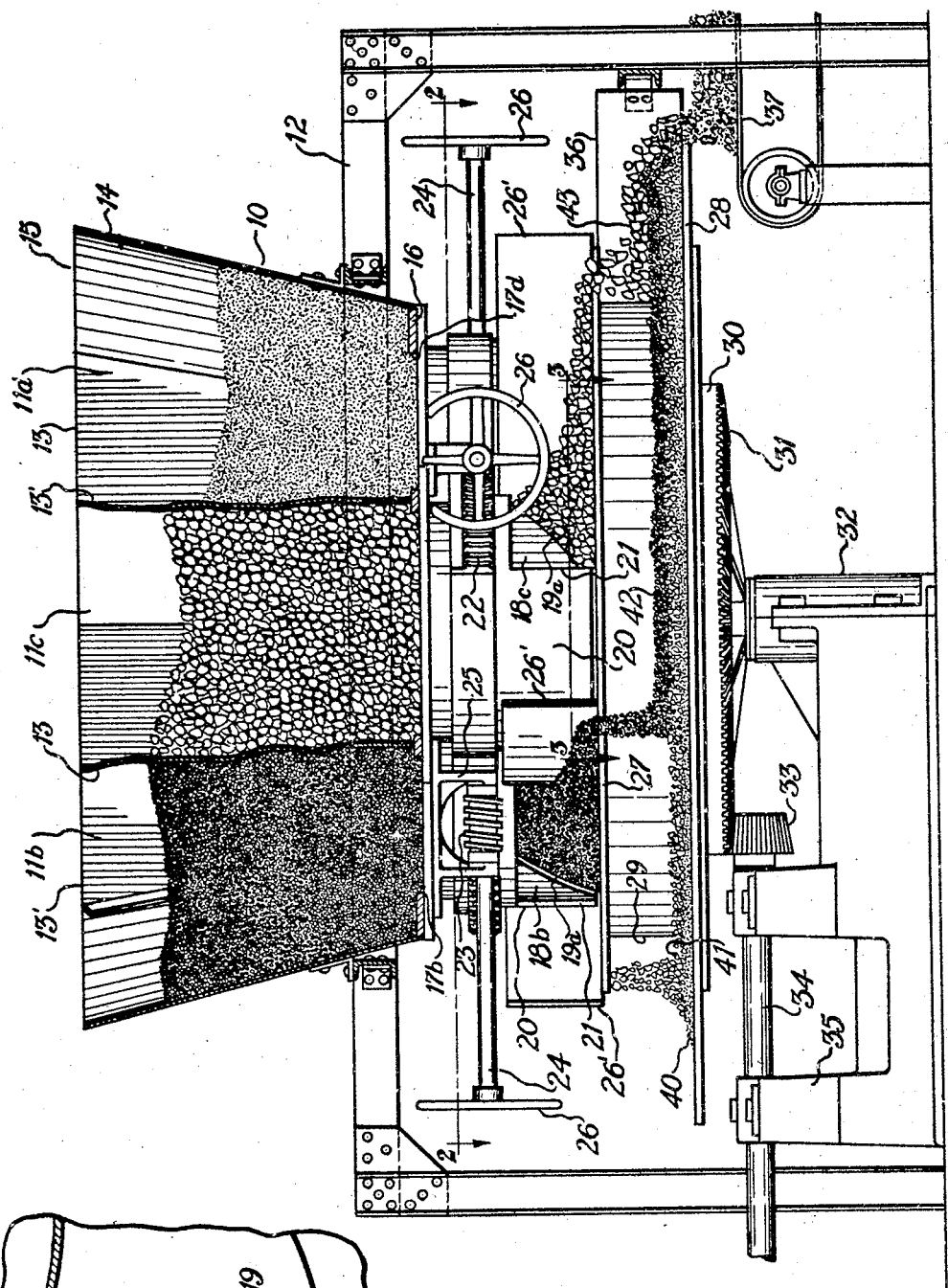
Figure 2:
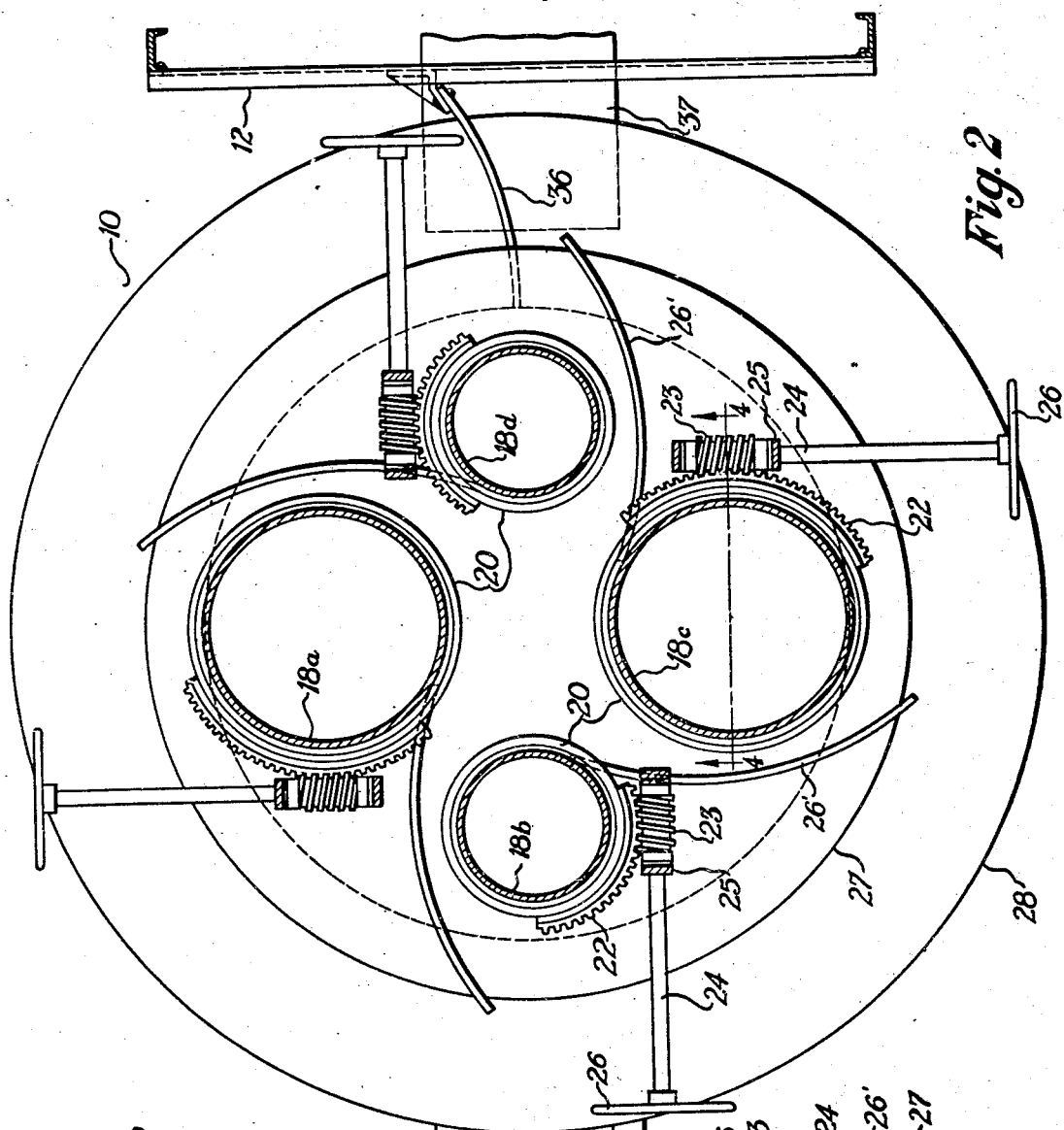
Figure 5:
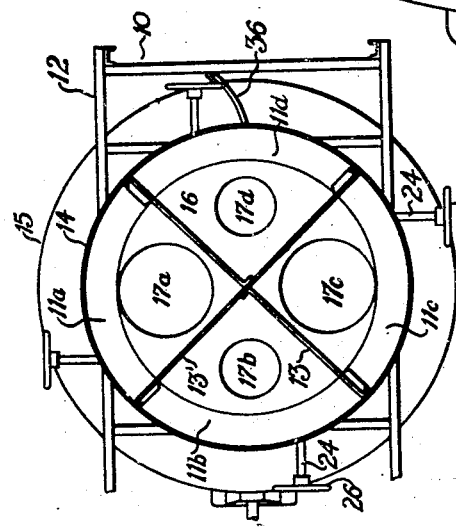
Figure 4:
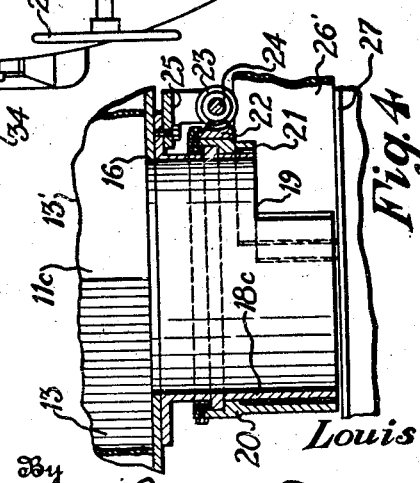

A preferred embodiment of the invention is illustrated in the accompanying drawings forming part hereof, in which Figure 1 is a side elevation of an embodiment of the improved disk feeder and mixer, with portions broken away to more clearly illustrate details of construction and operation;

Fig. 2, a fragmentary plan sectional view thereof as on line 2—2, Fig. 1;

Fig. 3, a fragmentary plan sectional view thereof as on line 3—3, Fig. 1, illustrating one of the spouts, the control valve therefor, and two of the scraper blades;

Fig. 4, a fragmentary vertical sectional view thereof as on line 4—4, Fig. 2; and Fig. 5, a reduced plan view of the apparatus, illustrating the plurality of bins and the discharge spouts therefor.

Similar numerals refer to similar parts throughout the several views.

The improved disk feeder and mixer is indicated generally at 10, and includes a plurality of bins $11^a$, $11^b$, $11^c$, and $11^d$, which may be carried by a supporting frame 12, and which may be as illustrated formed by cross partitions 13 and 13' extending between opposite elements of the interior surface of the side wall 14 of an inverted frusto conical receptacle 15 opening towards the top, and which includes in addition to the side wall 15, a bottom wall 16, which is common for all of the bins $11^a$, $11^b$, $11^c$, and $11^d$.

Outlet openings $17^a$, $17^b$, $17^c$, and $17^d$, respectively, are provided in the bottom wall 16 for the bins $11^a$, $11^b$, $11^c$, and $11^d$.

Spouts $18^a$, $18^b$, $18^c$, and $18^d$ are connected respectively at their upper ends with the bottom wall 16, in communication with the openings $17^a$, $17^b$, $17^c$, and $17^d$, and depend downwardly from the bottom wall.

Each spout preferably has a side notch 19 cut therein for permitting discharge of material from the bin through the spout, and valve means controlling the flow of material through the notch may be provided for each spout as by means of a sleeve 20 preferably rotatably mounted on the outer side of the spout, and having a notch 21 in its side similar to the spout notch 19, the sleeve being arranged to be rotated for opening and closing the passageway through the spout notch 19 by increasing and decreasing the registration of the notches 19 and 21 with each other.

Each valve sleeve 20 may be rotated as by means of a worm gear sector 22 secured thereto, and meshed with a worm 23 carried on a valve actuating shaft 24 which is journalled in a suitable bearing bracket 25 secured to the bin bottom wall 16; and a hand wheel 26 is mounted at the outer end of each shaft 24 for rotating the same and the worm thereon for adjustably varying the discharge opening for the spout for which the particular valve means is provided.

A preferably arcuate scraper blade 26' extends tangentially from an inner side of each spout, for scraping cooperation with a rotary feeding disk 27 which is preferably horizontal and mounted for rotation about a vertical axis, so that its upper surface is closely adjacent but not touching the lower ends of the several spouts.

A preferably annular mixing disk 28 is located below and concentric with the feeding disk 27. The mixing disk has a greater diameter than the feeding disk, and is preferably secured thereto as by means of a spacer sleeve 29 secured at its upper end to the feeding disk and at its lower end to the mixing disk.

The feeding disk and mixing disk assembly thus formed is preferably mounted for rotation upon the upper face of a wheel 30, the lower face of which is formed as a bevel gear 31, and the wheel 30 is secured at the upper end of a vertical shaft which is journalled in a suitable bearing 32.

A bevel drive pinion 33 is meshed with the bevel gear 31 and the drive pinion is secured at the inner end of a drive shaft 34 journalled in a suitable bearing bracket 35, and arranged to be driven by any suitable motor not shown.

A scraper blade 36 may be supported at its outer end from the frame 12, and extends across the upper surface of the annular mixing disk 28, for scraping mixed material therefrom, as the disks rotate, upon a conveyor 37 or the like.

In use, each of the several bins 11ª, 11ᵇ, 11ᶜ, and 11ᵈ, respectively, is filled with a separate material as illustrated in Fig. 1. Each valve is adjusted to provide the desired rate of flow of the particular material therethrough, and the disks are rotated.

The several scraper blades 26' cooperating with the feeding disk rotating beneath them, serve to feed the several different kinds of materials over the outer edge of the feeding disk from which they drop in continuous streams onto the annular mixing disk to form the layers 40, 41, 42, and 43.

The single scraping blade 36 cooperating with the annular mixing disk rotating thereunder serves to simultaneously mix the layers of material and scrape the mixed material over the outer edge of the mixing disk onto the conveyor 37 or the like.

It is obvious that any desired proportions of the several materials may be obtained by suitable regulation of the several valves.

It is preferred that each side notch 19 be provided with a spiral upper edge 19ª as illustrated, with the spiral commencing at the outer end of the opening and increasing the depth of the opening towards the center of the apparatus.

This prevents the material dropping through the spouts from flowing out of control from the bins, providing the necessary back pressure to maintain the material in the bins.

I claim:

1. A disk feeder and mixer including a plurality of bins each adapted for containing a different material, a feeding disk mounted for rotation a substantial distance below the bins, a mixing disk mounted for rotation below the feeding disk, a spout extending between each bin and the feeding disk for discharging material from the bin onto the feeding disk, a scraper associated with each spout for scraping material discharged therefrom onto the mixing disk, and a scraper for mixing and scraping the material from the mixing disk.

2. A disk feeder and mixer including a plurality of bins each adapted for containing a different material, a mixing disk mounted for rotation a substantial distance below the bins, a spout extending below each bin for discharging material from the bin onto the disk, a scraper for mixing and scraping the material from the disk, and sleeve valve means for each spout for controlling the flow of material therethrough.

3. A disk feeder and mixer including a plurality of bins each adapted for containing a different material, a feeding disk mounted for rotation a substantial distance below the bins, a mixing disk mounted for rotation below the feeding disk, a spout extending between each bin and the feeding disk for discharging material from the bin onto the feeding disk, a scraper associated with each spout for scraping material discharged therefrom onto the mixing disk, a scraper for mixing and scraping the material from the mixing disk, and sleeve valve means for each spout for controlling the flow of material therethrough.

4. A disk feeder and mixer including a plurality of bins each adapted for for containing a different material, a feeding disk mounted for rotation a substantial distance below the bins, a mixing disk mounted for rotation below the feeding disk, a spout extending between each bin and the feeding disk for discharging material from the bin onto the feeding disk, a scraper associated with each spout for scraping material discharged therefrom onto the mixing disk, a scraper for mixing and scraping the material from the mixing disk, and the feeding disk and mixing disk being secured to each other for rotation with each other.

5. A disk feeder and mixer including a plurality of bins each adapted for containing a different material, a feeding disk mounted for rotation a substantial distance below the bins, a mixing disk mounted for rotation below the feeding disk, a spout extending between each bin and the feeding disk for discharging material from the bin onto the feeding disk, a scraper associated with each spout for scraping material discharged therefrom onto the mixing disk, a scraper for mixing and scraping the material from the mixing disk, sleeve valve means for each spout for controlling the flow of material therethrough, and the feeding disk and mixing disk being secured to each other for rotation with each other.

In testimony that I claim the above, I have hereunto subscribed my name.

LOUIS C. BONNOT.